Patented Nov. 12, 1929

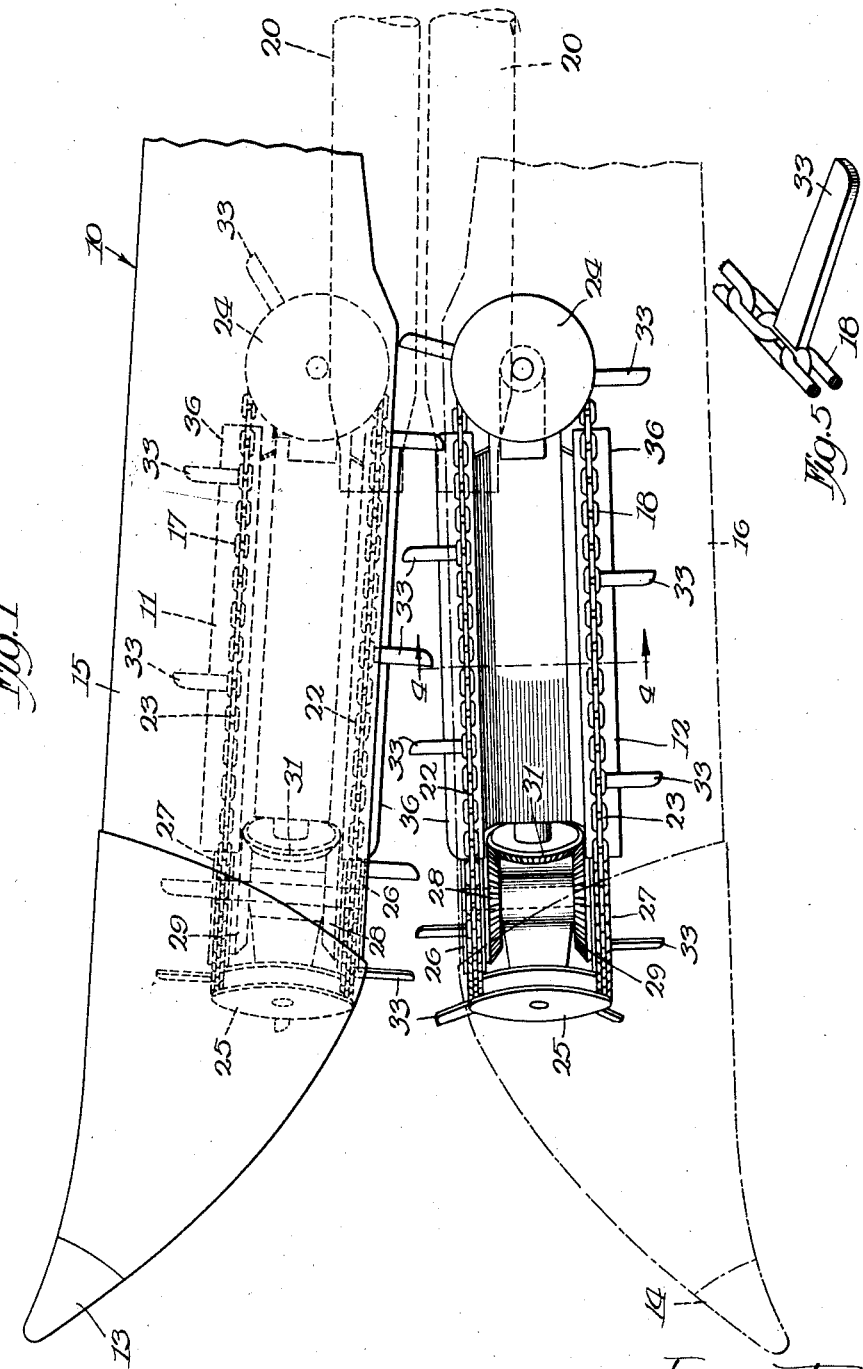

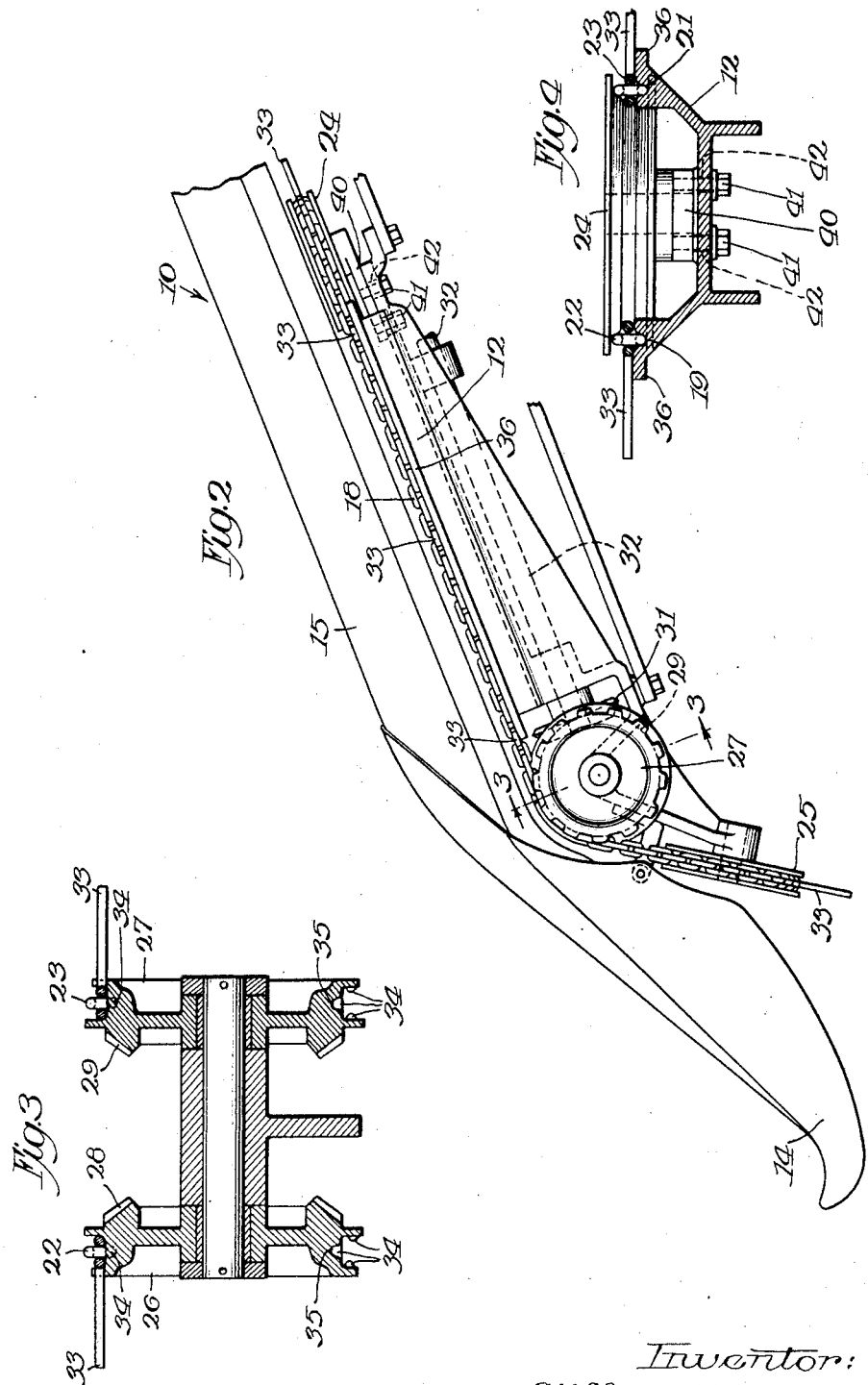

1,734,972

UNITED STATES PATENT OFFICE

CLIFFORD J. JOHNSON, OF NEAR LELAND, ILLINOIS

CORN HARVESTER

Application filed March 25, 1927. Serial No. 178,189.

This invention relates to corn pickers, and more particularly to the gathering mechanism.

The principal object of the invention is the provision of a new and improved arrangement of the gathering chains for lifting the fallen stalks and guiding them to the snapping rolls.

Another object of the invention is the provision of new and improved means for changing the direction of travel of the forward portion of the gathering chains for more efficiently lifting the fallen stalks.

A further object of the invention is the provision of a new and improved corn gathering mechanism that is simple in construction, cheap to manufacture, efficient in operation, and that is not likely to become broken or get out of order.

Other and further objects and advantages of the invention will appear from the following description taken in connection with the accompanying drawings, in which Fig. 1 is a plan view of a portion of a harvester showing my invention in position thereon, with parts removed;

Fig. 2 is a side elevation thereof;

Fig. 3 is a section on line 3—3 of Fig. 2;

Fig. 4 is a section on line 4—4 of Fig. 1; and

Fig. 5 is a perspective view of a portion of the chain showing one of the gathering fingers or bars in positon thereon.

On the drawings, the reference character 10 designates generally the corn gatherer mechanism of a corn picker or corn harvester. This mechanism comprises the inner and outer gatherer boards 11 and 12 to the forward ends of which are pivotally mounted the inner and outer gatherer points 13 and 14, respectively, as is usual in such constructions. The snapping rolls are shown more or less diagrammatically in dotted lines at 20, and are of any approved construction. The gatherer boards may be and preferably are divergent forwardly. The gatherer boards 11 and 12 are provided with gatherer sheets 15 and 16 extending over the same and held in spaced relation thereto.

Endless gatherer chains 17 and 18 are mounted on the boards 11 and 12 beneath the sheets 15 and 16, respectively. Preferably, though not necessarily, a single gatherer chain is employed for each gatherer board.

Each of the boards 11 and 12 is preferably provided with grooves 19 and 21 for guiding the inner and outer runs 22 and 23, respectively, of the gatherer chains, see Fig. 4.

Suitable means are provided for operating the chains. Since the operating mechanism is substantially the same for each chain, except that the chains are run in opposite directions, only one set of mechanism need be described. The upper end of the chain is trained about an idler or guiding pulley 24. The lower end or loop of the chain is trained about an idler or guiding pulley 25 arranged in a plane extending downwardly and slightly forwardly from the plane of the gatherer board. Drive pulleys 26 and 27, which for convenience will be termed sprockets, are provided for driving the chain. These pulleys are provided with bevel gears 28 and 29 respectively, which mesh with a bevel gear 31 on the power shaft 32 for driving the gears 28 and 29 in opposite directions for moving the chain continually in one direction. The run 23 of the chain 19 is moved downward and the inner run 22 upward in the operation of the harvester.

The gatherer chains are each provided with laterally extending projections or gatherer fingers or bars 33. These fingers are preferably attached to the chain at regular intervals, as indicated in Figs. 1 and 5, and are so arranged that the fingers of one chain will not interfere with the movements of the fingers of the other chain.

although their paths of movement overlap, especially at the upper portion of the chains.

The drive pulleys are provided with suitable lugs 34 in the bottom and side walls of the grooves 35 for positively driving the chains. The outer side walls of the grooves 35 are notched or cut away at suitable intervals for accommodating the fingers or bars 33. The fingers or bars 33 are held in laterally extending position by laterally extending flanges 36 on the gatherer boards, see Fig. 4.

It is not uncommon for corn in the field to be blown down or partly down by storms or winds before gathering time. With the harvesters usually employed a considerable proportion of the corn that is down or partly down cannot be gathered because the stalks are not properly delivered to the snapping rolls.

With the present invention the forward portion of the gatherer chains is arranged in a more nearly vertical plane than the upper portion, consequently the fingers on this portion of the chain being also near the ground will first lift the stalks and then feed them to the snapping rolls.

Suitable means are also provided for tensioning the gatherer chains. As shown, the upper pulleys or idlers 24, see Figs. 2 and 4, are mounted on plates 40 which are slidably mounted in a depression 41 extending longitudinally of each board. The plates are held in adjusted position by bolts 41 which engage slots 42 in said board.

It is thought from the foregoing taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. A gathering mechanism for a corn harvester comprising a pair of endless gatherer chains, each chain forming a forward and a rearward loop, means for supporting the rearward loops of said chains in the same plane, means for supporting the forward loops of said chains in the same plane and at an angle to the plane of said rearward loops, and means for driving said chains.

2. In a corn harvester, a pair of endless gatherer chains, said chains having forward and rearward loops and having gatherer fingers extending outwardly in the planes of said loops, means for supporting said chains and fingers, means for driving said chains, and idler pulleys around which the forward portions of said chains extend, each of said pulleys having its axis in a plane substantially parallel with the longitudinal axis of said harvester.

3. In a corn harvester, a pair of endless gatherer chains having laterally extending gatherer fingers thereon, said chains converging rearwardly, and sprockets arranged at substantially right angles to the planes of said chains for driving said chains, the foremost sprockets having their axes in vertical planes extending longitudinally of the harvester.

4. In a corn harvester, a pair of endless gatherer chains each having a forward loop and a rearward loop, a pulley for each rearward loop, said chains converging rearwardly, driving sprockets each engaging both runs of a loop of said chain and arranged in planes at substantially right angles to the planes of said loops, and idlers engaging said forward loops for guiding the forward loops of said chains downwardly and forwardly from the plane of the rear loops of said chains, the forward loops of said chains being in a common plane extending forwardly and downwardly from the plane of the rear loops thereof.

5. In a corn harvester, a pair of gatherer members diverging forwardly, a single gatherer chain for each member, a pair of bevel gears on each member, a sprocket on each gear, each chain forming a forward and a rearward loop, and a bevel gear for driving said gears in opposite directions, said sprockets engaging both runs of the cooperating chain at a point intermediate the looped ends of said chain.

6. In a corn harvester, a pair of chain supporting members spaced apart and adapted to straddle a row of corn, a plurality of pulleys including forward and rearward pulleys, carried by each of said members, the rearmost pulleys of said members being in a plane extending upwardly and rearwardly relative to the longitudinal axis of said harvester, and the foremost pulleys of said members being in a common plane extending upwardly and rearwardly at an angle to the plane of said rearmost pulleys, gatherer chains extending about said pulleys, and means for operating said chains.

7. In a corn harvester, a gatherer board, a bracket extending downwardly from the front end of said board, an idler pulley mounted on said board at the upper end thereof, an idler pulley mounted on said bracket at the lower end of said board, said pulleys having their planes at an angle to each other, a pair of driving pulleys operating in vertical planes, bevel gears on said pulleys, a drive shaft, a bevel gear on said shaft for driving said drive pulleys, an endless chain trained about said idler pulleys and engaging said drive pulleys, means for adjusting said upper idler pulley for adjusting the tension of said chain, gatherer fingers on said chains, and means for supporting said fingers in a horizontal position.

8. In a corn harvester, a pair of gatherer members diverging forwardly, an endless gatherer chain on each member, stalk engaging members on each chain, sprockets having axes extending substantially transversely to the longitudinal axis of said harvester for supporting, guiding and operating the rear portions of said chains, and sprockets having axes extending substantially longitudinally of said harvester for guiding and supporting the forward portion of said chains at an angle extending downwardly and forwardly from the rear portions thereof.

In testimony whereof I affix my signature.

CLIFFORD J. JOHNSON.

CERTIFICATE OF CORRECTION.

Patent No. 1,734,972.  Granted November 12, 1929, to

CLIFFORD J. JOHNSON.

It is hereby certified that error appears in the printed specification of the above numbered patent requiring correction as follows: Page 2, line 51, claim 1, after the word "and" insert the words "in a plane"; and that the said Letters Patent should be read with this correction therein that the same may conform to the record of the case in the Patent Office.

Signed and sealed this 17th day of December, A. D. 1929.

(Seal)

M. J. Moore,
Acting Commissioner of Patents.